United States Patent [19]

Richards et al.

[11] 4,072,226

[45] Feb. 7, 1978

[54] CONVEYOR APPARATUS FOR USE WITH A CONTAINER MANUFACTURING APPARATUS

[75] Inventors: Frank P. Richards, Prairie Village, Kans.; Raymond C. Taylor, Grandview, Mo.

[73] Assignee: Phillips Petroleum Company, Bartlesville, Okla.

[21] Appl. No.: 630,555

[22] Filed: Nov. 10, 1975

[51] Int. Cl.[2] .......... B65G 25/04

[52] U.S. Cl. .......... 198/345; 198/487; 198/740

[58] Field of Search .......... 198/339, 345, 379, 436, 198/487, 740, 456, 19, 31 AB, 218, 221, 737

[56] References Cited

U.S. PATENT DOCUMENTS

| | | | |
|---|---|---|---|
| 1,526,554 | 2/1925 | Lake | 93/39.2 |
| 1,891,866 | 12/1932 | Bodor | 93/36.5 |
| 2,614,681 | 10/1952 | Keil | 198/379 |
| 2,661,790 | 12/1953 | Slaughter | 156/423 |
| 2,726,583 | 12/1955 | Barnes et al. | 93/39.2 |
| 2,755,712 | 7/1956 | O'Neil | 93/39.2 |
| 2,940,582 | 6/1960 | Boros | 198/240 |
| 3,311,217 | 3/1967 | Muhlenbruch | 198/436 |
| 3,358,808 | 12/1967 | Reynolds | 198/379 |
| 3,814,232 | 6/1974 | Eriksson | 198/339 |

*Primary Examiner*—John J. Love
*Assistant Examiner*—Joseph E. Valenza

[57] ABSTRACT

A conveyor apparatus is provided for use with a container manufacturing apparatus wherein the container manufacturing apparatus forms a generally tubular container on a mandrel with an end member being sealed to the container side wall to form an open topped container. The conveying apparatus moves the open topped containers through one or more finishing stations for appropriate finishing of the container's open end in order to ready the container for filling and acceptance of a closure. As the open ended container is conveyed incrementally by the conveyor apparatus to and received at one or more finishing stations, the bottom of the container is gripped while appropriate modifications are made to the top thereof.

15 Claims, 18 Drawing Figures

CONVEYOR APPARATUS FOR USE WITH A CONTAINER MANUFACTURING APPARATUS

This invention relates to a method and apparatus for forming a container. In another aspect the invention relates to a method and apparatus for finishing the open end of a formed container. In yet another aspect the invention relates to a method and apparatus for finishing a formed container. In still another aspect the invention relates to a method and apparatus for incrementally conveying an article to one or more preselected stations.

The use of convolute sidewall paperboard or thermoplastic-coated paperboard containers has heretofore been generally limited to applications in which all containers of a certain type will have a specific style of top or bottom configuration. For example, a frustoconical container commonly used for ice cream or other frozen dairy products is nearly always equipped with a rolled top rim for accepting a closure having a generally planar central surface with an annular flange depending therefrom to engage the rolled container top. Similarly, other various styles of containers have often been characterized by a particular top configuration and closure with the apparatus for forming the container being designed in a fixed manner for formation of the desired top configuration and with retooling or redesign of the manufacturing equipment being necessary in order to alter the top configuration or other finished features of the container. The substitution of paperboard or coated paperboard containers for metal or plastic containers for economic, ecological, weight, esthetic, or other reasons has carried with it a demand for more versatile container configurations whereby a single basic container can be used in a number of different applications with the finishing and details of the container, particularly the end from which the container is filled and closed, can be readily adapted to suit various needs.

Accordingly, an object of the invention is to provide a method and apparatus for forming a container. Another object of the invention is to provide a method and apparatus for finishing the open end of a formed container. Yet another object of the invention is to provide a method and apparatus for finishing a formed container. Still another object of the invention is to provide a method and apparatus for incrementally conveying an article to one or more preselected stations.

In accordance with the invention there is provided a method and apparatus whereby a tubular container is formed from a generally rectangular flat sidewall blank having thermoplastic coatings on the upper and lower surfaces thereof by providing a closure member and a sidewall blank to a forming mandrel of a turrent having a plurality of such mandrels positioned thereon with each such mandrel being successively advanced to a closure feeding station, a sidewall feeding station, a sidewall wrapping station, a bottom heating station, a bottom sealing station, and a container removal station, with each container being removed from a forming mandrel being delivered to a receiving station of a container finishing apparatus. A conveyor means associated with the container finishing apparatus incrementally advances each container to a series of subsequent stations at least one of which is a container finishing station where the bottom of the container located therein is grasped in order to secure the container while appropriate container finishing means located at the container finishing station perform a finishing operation on the container. The finished container is thereafter delivered to a discharge station for subsequent delivery to a filling and capping apparatus or other subsequent disposition as desired. In a preferred embodiment each container forming machine is associated with container finishing apparatus which is adapted to simultaneously perform finishing steps on a plurality of containers. In a particularly preferred embodiment the containers received from the container forming apparatus are divided between two container finishing lines. A presently preferred conveyor method and apparatus for use in conjunction with a container finishing apparatus or other similar apparatus is a system which employs a plurality of generally parallel transverse arm members each rigidly affixed to a longitudinal frame member and each spaced at substantially equal distances along the longitudinal frame member with the entire structure being moved in a circular fashion whereby each point along the apparatus traces a circular locus of movement which is generally parallel to the direction of extension of the transverse arm members from the longitudinal frame member. Such a conveyor is particularly useful in conjunction with a smooth surface over which the container, contacted by the arm members, slides from one station to the next. In addition, suitable guide means such as guide rails can be used to insure that container movement is confined to a desired path. It is also presently preferred to grasp the bottom of each container at each of the one or more finishing stations associated with the container finishing apparatus in order to maintain the container in a desired position while the finishing apparatus is operating upon it. Grasping only the bottom portion of the container is advantageous in that it minimizes marring of the outside of the container which might otherwise be a problem and additionally greatly simplifies the construction of the container-holding apparatus without sacrificing the stability required to insure proper container finishing. The container gripping method and apparatus of the invention are capable of providing such stability without supporting the container along at least substantially its full height and circumference as is commonly practiced by the prior art.

Other objects and advantages of the invention will be apparent from the remainder of the specification and the claims to the invention as well as from the drawing in which FIG. 1 is a diagrammatic representation of a container forming machine embodying the present invention;

Figure 1:
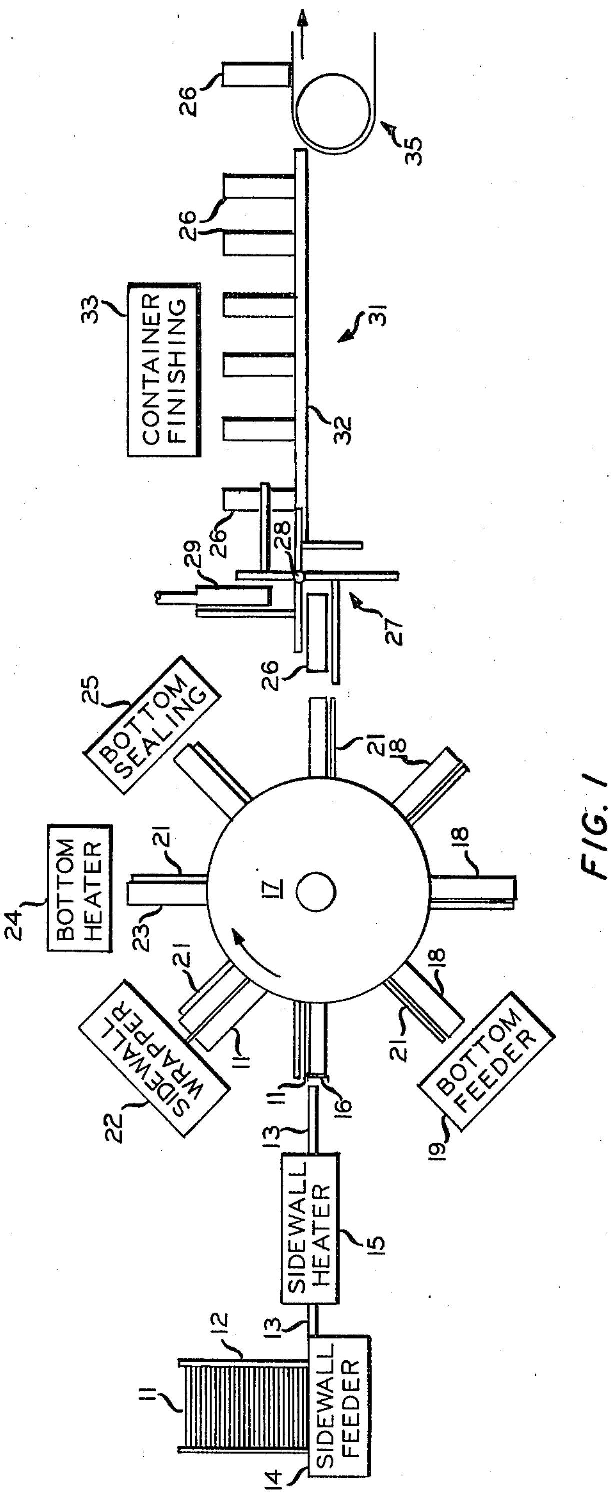
Figure 7:
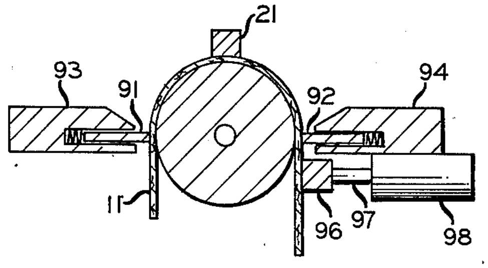
FIG. 7 is a cross sectional view seen along line 7—7 of FIG. 6.
Figure 8:
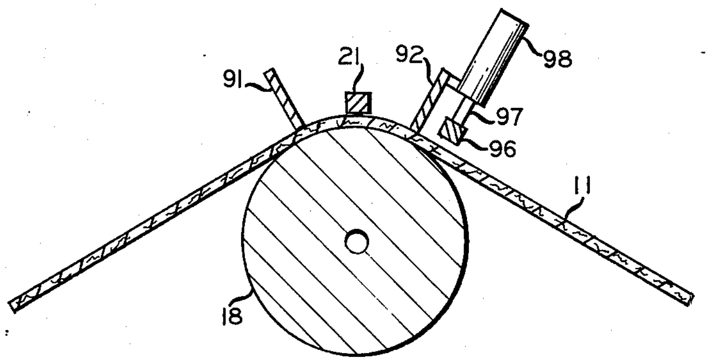
Figure 9:
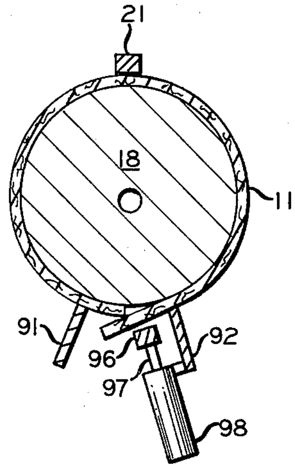
Figure 10:
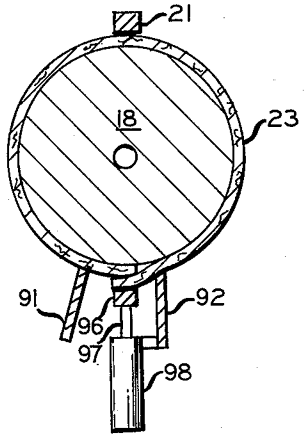
Figure 11:
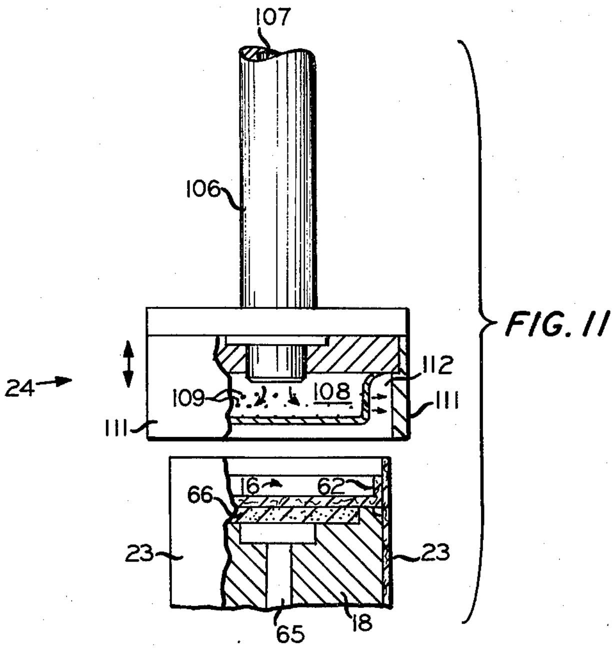
Figure 12:
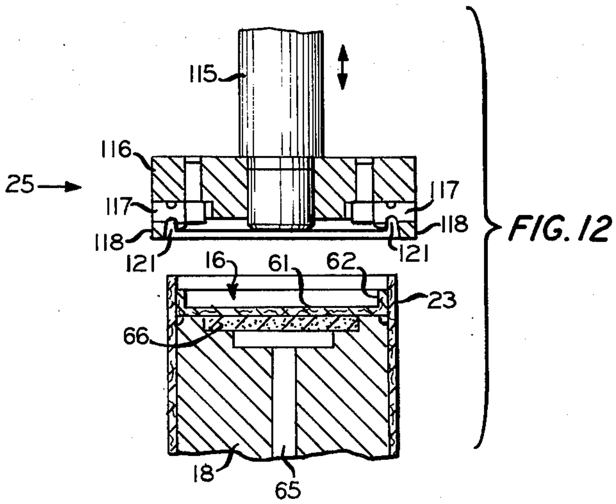
Figure 13:
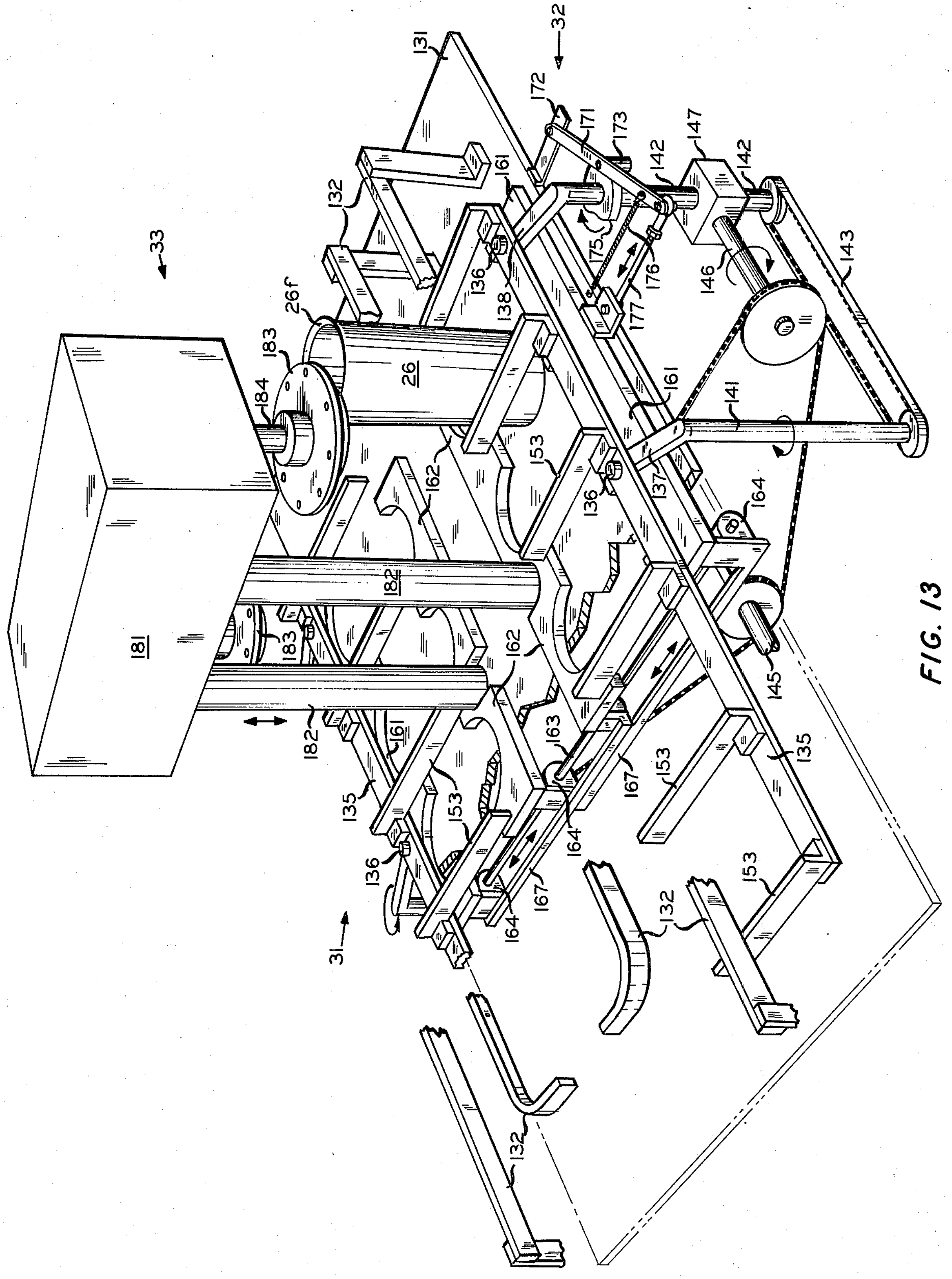
Figure 14:
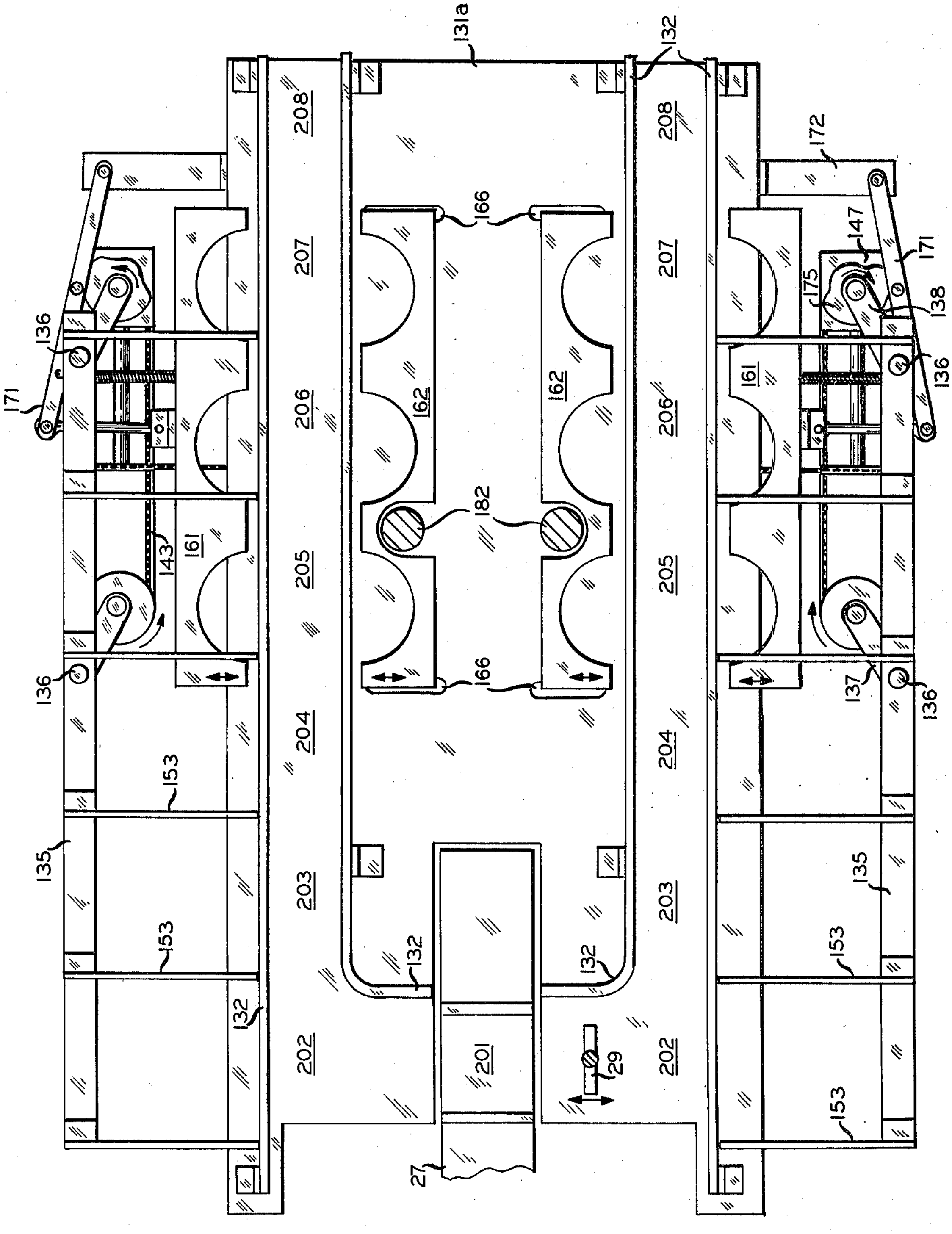
Figure 15:
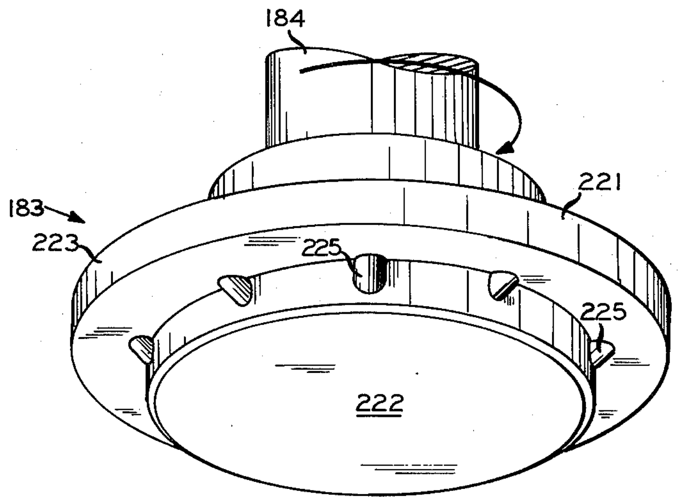
Figure 16:
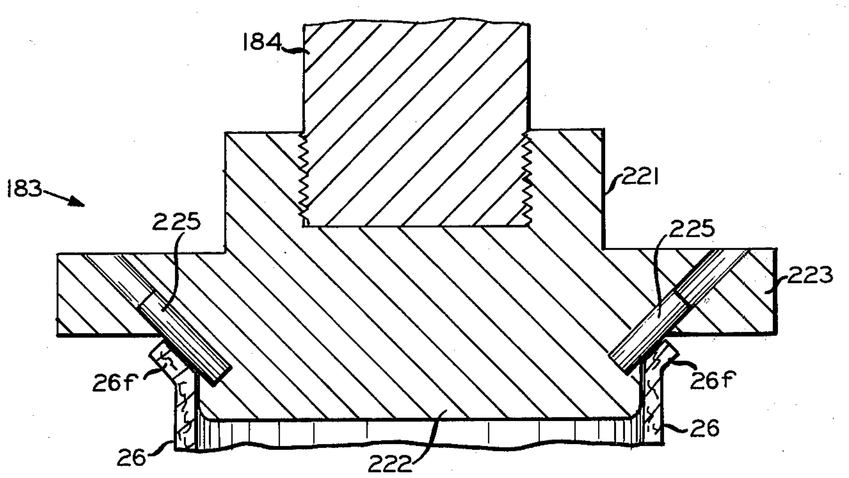
Figure 17:
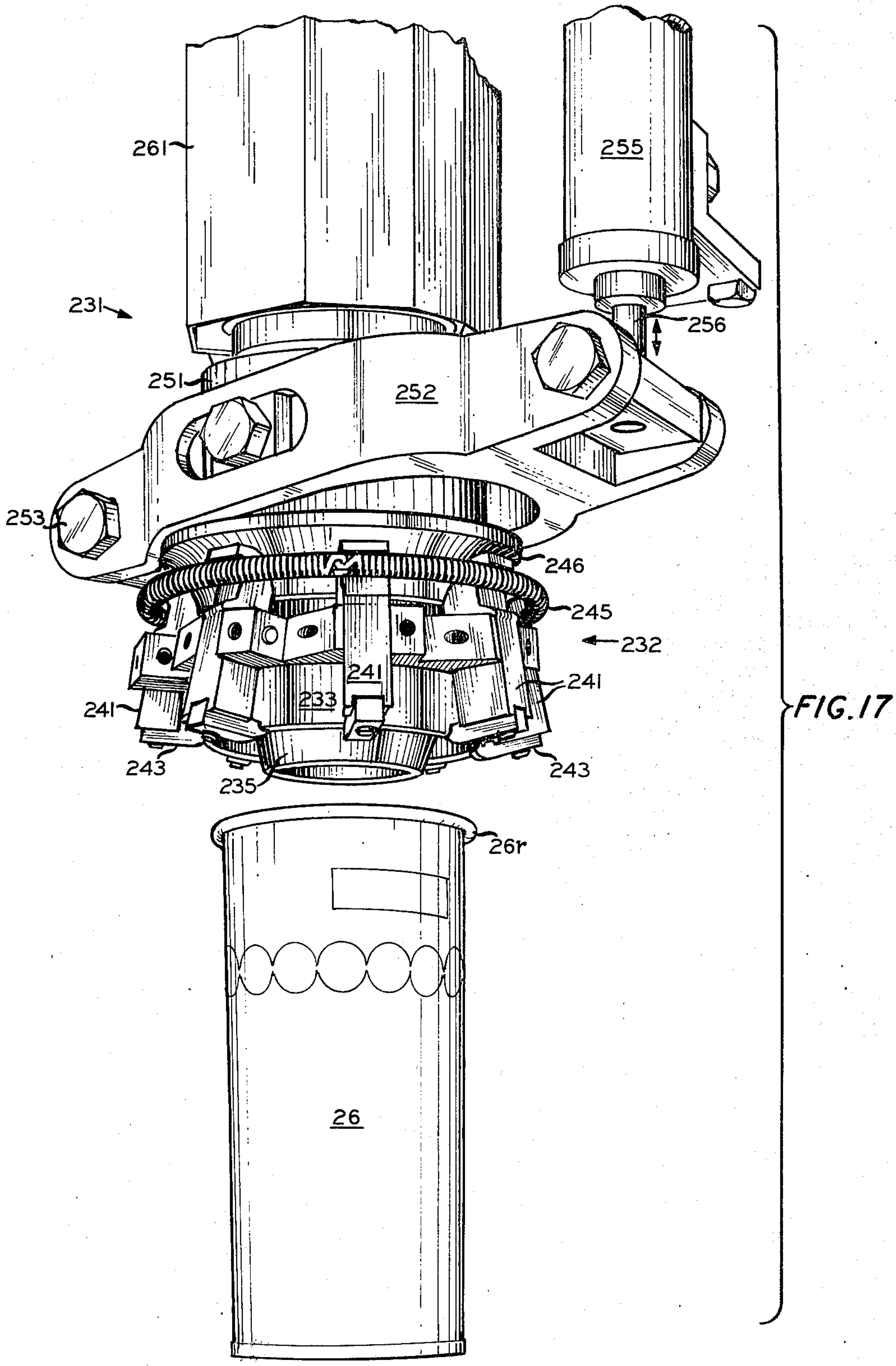
Figure 18:
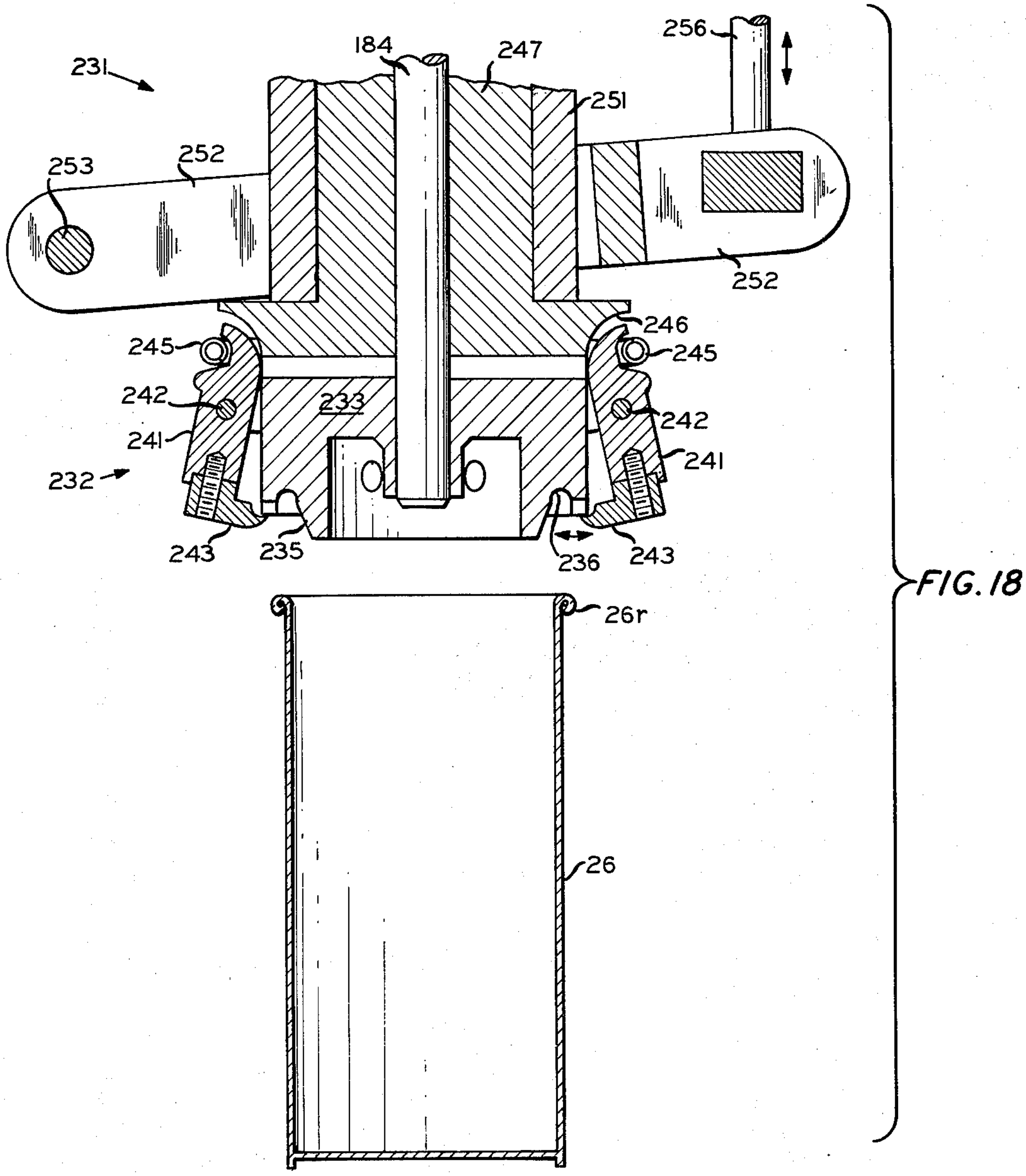

FIGS. 8, 9, and 10 are simplified views similar to FIG. 7 showing the sidewall wrapping mechanism in three sequential stages of operation;

FIG. 11 is an elevation view, in partial cross section, of the bottom heating apparatus of the machine of FIG. 1;

FIG. 12 is an elevation view, in partial cross section, of the bottom sealing apparatus of the machine of FIG. 1;

FIG. 13 is a partially cutaway pictorial view of the finishing apparatus of the machine of FIG. 1;

FIG. 14 is a plan view of the apparatus of FIG. 13;

FIG. 15 is a pictorial view of a preferred flaring apparatus which can be used in accordance with the invention;

FIG. 16 is a cross section of the flaring head of FIG. 15;

FIG. 17 is a pictorial representation of a preferred rolling head which can be used in accordance with the invention; and FIG. 18 is a cross section of the rolling head of FIG. 17.

Referring now to FIG. 1 in detail, thermoplastic coated paperboard sidewall blanks 11 are individually withdrawn from magazine 12 and transferred to conveyor 13 by sidewall feeder 14. The blank 11 is passed through sidewall heater 15 to heat to a suitable bonding temperature the thermoplastic coating in the side marginal positions which are to be overlapped in the formation of the sidewall into a container. Turret 17 is mounted for rotation about its horizontal axis and is provided with a plurality of mandrels 18 which extend radially outwardly from said horizontal axis in a vertical plane perpendicular to said horizontal axis. The mandrels 18 are spaced apart on the turret 17 in a uniform manner. A suitable bottom feeder mechanism 19 supplies individual bottom members 16 to the outermost end face of mandrels 18. Each mandrel 18 is provided with suitable means, for example a suction means, to hold the bottom member 16 in place on the end face of the mandrel. The turret rotates, stepwise, in a clockwise direction as viewed in FIG. 1, to move a bare mandrel to the bottom feeding station to receive a bottom member 16 and then to the horizontal position in alignment with conveyor means 13 to receive a heated blank 11. Each mandrel 18 has a sidewall clamp 21 associated therewith which is in the open position, spaced apart from its mandrel 18, at the sidewall blank receiving station to permit the heated blank 11 to be inserted between the mandrel 18 and clamp 21 by conveyor means 13. The clamp 21 is then actuated to secure the median or intermediate portion of the heated blank 11 in position on mandrel 18, after which the turret 17 is indexed to the next position to carry the secured blank 11 and bottom member 16 to the sidewall wrapping station. The sidewall wrapping means 22 wraps the blank 11 around mandrel 18 to form a convolute and to apply pressure to the overlapped heated side margins to bond the side margins, thereby forming a tubular sidewall 23.

At the next indexing of turret 17, the mandrel carrying the tubular sidewall 23 is moved from the sidewall wrapping station to the bottom heating station, where the margin of the sidewall adjacent the bottom member 16 is heated by bottom heating means 24 to a suitable bonding temperature. The turret 17 is then indexed to transport the mandrel 18 and the heated sidewall 23 to a bottom sealing station, where bottom sealing means 25 applies pressure to the heated portions of the sidewall 23 and bottom member 16 to form the bottom seal. In one embodiment the bottom member 16 has a shape at least substantially equal to the shape of the end face of mandrel 18, and the bottom margin of the tubular sidewall 23 is folded inwardly into contact with the bottom member 16 to form the bottom seam. A container of this type is illustrated by I. L. Wilcox in U.S. Pat. No. 3,369,726, issued Feb. 20, 1968. In another embodiment the bottom member 16 can be formed with a central disc portion having a diameter substantially equal to the diameter of the end face of mandrel 18 and an annular flange portion folded to extend outwardly from the mandrel 18 at least approximately parallel to the side surface of the mandrel 18. In the latter embodiment the flange portion of the bottom member 16 can be bonded to the contacting surface of the tubular sidewall 23. If desired, the tubular sidewall bottom margin can be longer than the flange of bottom disc member 16 to permit the bottom margin to be folded approximately 180° to form a U which contacts both sides of the flange of bottom member 16. If desired, the bottom seam can be rolled by suitable known means. Where the bottom member 16 is flanged, bottom feeder 19 can employ a suction cup transfer mechanism, or flat discs can be chip fed and then forced through a die to form the flange and then applied to the end face of mandrel 18.

After the bottom seal is formed, the turret 17 is indexed to transport the formed container 26 to a stripping station, and the associated clamp 21 is moved to the open position to release the container 26. Although any suitable mechanical stripping means can be employed, it is presently preferable to utilize pneumatic pressure applied through the mandrel to the inside of the container to eject the container from the mandrel 18 into a pocket of turret 27. Turret 27 is rotated stepwise about horizontal axis 28 to move the ejected container 26 from the initial horizontal position to a vertical position with the open end up. A pusher arm 29 is moved through the upright pocket of turret 27 to move the container 26 to the receiving station of a container finishing apparatus 31. If desired, two receiving stations can be positioned on opposite sides of turret 27 and pusher arm 29 can move alternate containers to opposite receiving stations.

The container finishing apparatus comprises a base assembly 32 equipped with conveyor means for moving the containers from station to station and means for grasping each container 26 as required to insure stability of the container during the finishing process. A finishing means 33 is located above one or more stations of the base assembly 32 for performing one or more finishing operations on the container 26 passing thereunder. The container finishing apparatus 31 delivers the finished containers to a suitable conveying means 35 for removing the finished containers 26 to a locatin for filling and sealing or for other disposition as appropriate.

Figure 2:
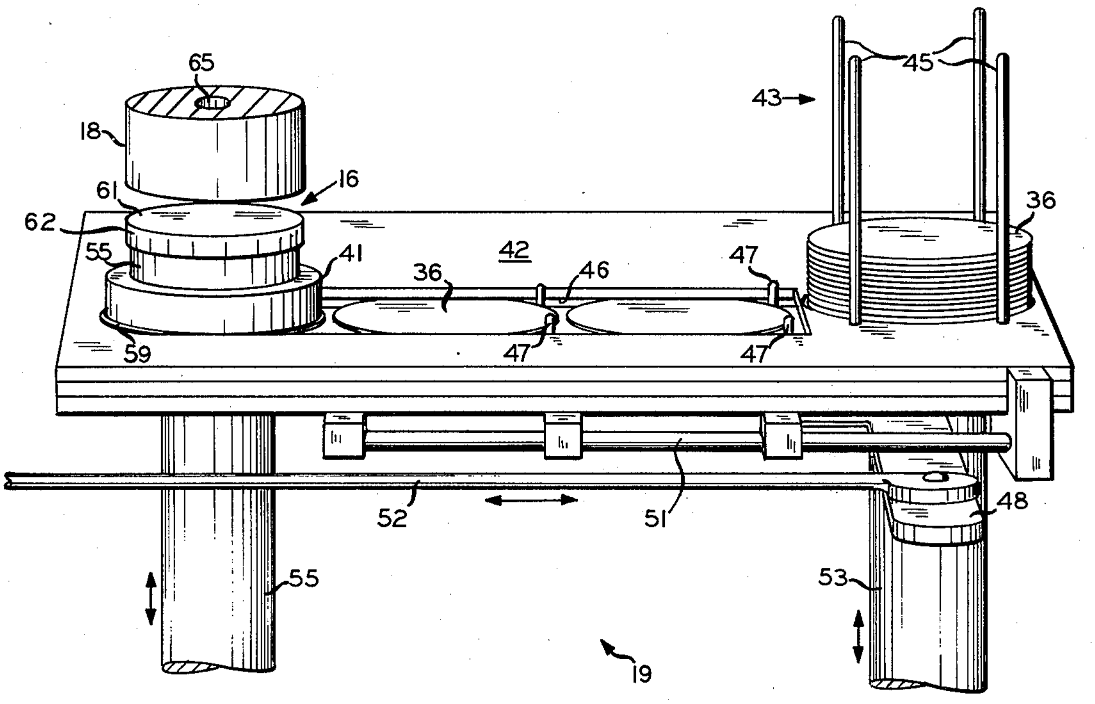
FIG. 2 is a pictorial representation of a portion of the closure blank feeding and closure forming apparatus of the machine of FIG. 1.
Figure 3:
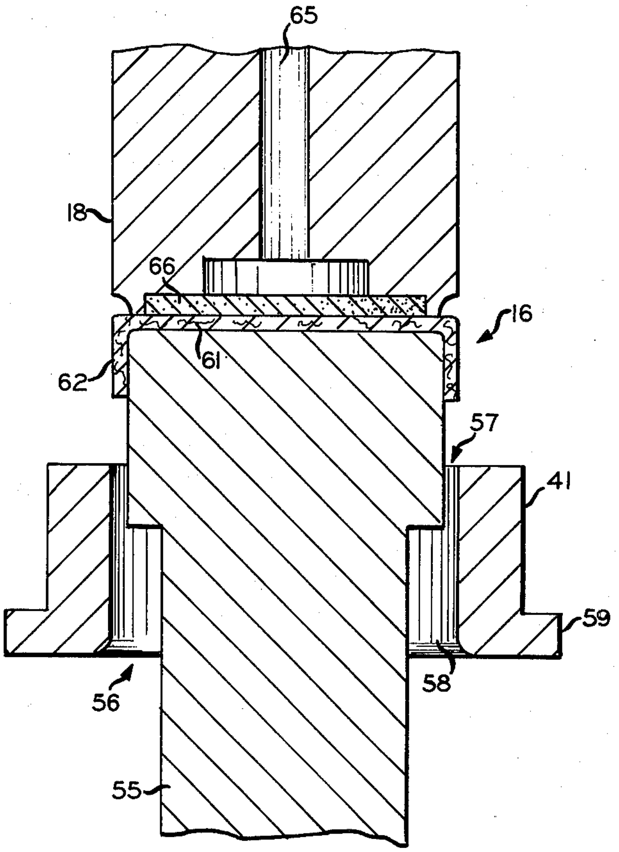
FIG. 3 is a cross section of the closure forming apparatus of FIG. 2.

FIGS. 2 and 3 illustrate a preferred bottom feeder means 19 which can be used with the apparatus of the invention. As shown, closure blanks 36 are fed to a forming die 41 by suitable means. In the illustrated structure the means include a support member 42 which has a storage magazine 43 formed by a plurality of upstanding members 45 and adapted to store a plurality of closure blanks 36. Tracks 46 are provided along which closure blanks 36 are moved from the magazine 43 to the die 41 such as by engagement with fingers 47. The fingers 47 are mounted on a carriage 48 which is slidably mounted on bearing rods or ways 51 with the carriage 48 being movable in response to actuation of a link 52 which is moved by power means (not shown) such as a pneumatic cylinder, a lever arm operable by the main drive shaft of the machine, or other suitable means. A reciprocating member 53 is equipped with suction means or other suitable means for removing the lowermost closure blank 36 from the storage magazine 43 and into position to be engaged by a pair of fingers 47. Movement of the carriage 48 in one direction indexes a closure blank 36 into a position between the die 41 and a plunger 55 as later described. Movement of the carriage in the opposite direction effects retraction of the fingers 47 so as to be out of engagement with a respective closure blank and upon return of the carriage 48 the fingers 47 are extended by means (not shown) for engagement once again with a closure blank 36.

Preferably, the die 41 is mounted on the support 42 and has open ends 56 and 57 (FIG. 3) whereby a closure blank 36 is moved into position adjacent the open end 56 by movement of the carriage 48. The die 41 and plunger 55 cooperate to form a closure member 16 from a bottom blank 36. As shown by FIG. 3, the die 41 has a through bore 58 with rounded edges at the first end 56 of the die 41 to provide a smooth lead-in to the forming area. A circumferential flange 59 is provided on the exterior of the die 41 to facilitate mounting of same on the support 42.

The plunger 55 has means cooperating therewith (not shown) to effect movement of the plunger 55 into and out of the bore 58 of the die 41. As the plunger 55 approaches a closure blank 36 located at the first end 56 of the die 41 a central portion of the closure blank 36 is contacted by the leading face of the die 55. Continuing movement of the plunger 55 through the die 41 produces a closure member 16 having a central discoidal portion 61 with an annular flange portion 62 extending around the periphery thereof. Further movement of the plunger 55 through the die 41 places the central portion 61 of the closure member 16 in contact with the end face of a mandrel 18 located at the bottom feeder station of the container forming apparatus. As the plunger 55 is withdrawn from the face of the mandrel 18 back through the die 41 in preparation for the acceptance of a subsequent closure blank 36 and formation of a subsequent closure member 16, the closure member 16 is maintained in place on the end face of the mandrel 18 by the application of subambient pressure through a central conduit 65 in the mandrel 18. The subambient pressure from the conduit 65 is applied to the central portion 61 of the closure member 16 by any suitable means such as a perforated end member on the mandrel 18. The preferred method of pressure application illustrated by FIG. 3 utilizes a scintered metal plate 66 of any suitable metal, preferably steel, through which the subambient pressure of the passageway 65 can be applied to the central portion 61 of the closure member 16. The actions of the link 52, reciprocating member 53, and plunger 55 are coordinated so that an orderly progression of closure blanks 36 is provided to the first end 56 of the die 41 to permit a closure member 16 to be delivered to the end face of each mandrel 18 arriving at the bottom feeder station 19 of the container forming apparatus.

Figure 4:
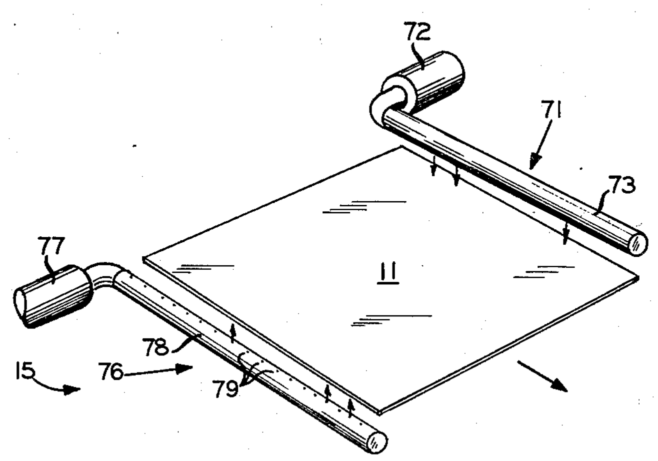
FIG. 4 is a pictorial representation of the sidewall heater employed with the machine of FIG. 1.

Referring now to FIG. 4, the edge heater 71 of the sidewall heater 15 comprises an electrical heater 72 having an air passage therethrough which is operably connected to a source of air under pressure (not shown) and an elongated tube 73 having one end connected to the hot air outlet of heater 72 and the other end closed. The tube 73 is provided with a series of orifices spaced along the length of the lower surface thereof in a pattern of one or more rows of orifices overlying the top surface of the left side margin of blank 11 in heating station 15 to direct jets of heated air against the top surface of said left margin to heat the thermoplastic coating thereon to a suitable bonding temperature. The designation of left and right are with reference to the view from magazine 12, the direction of motion toward the turret 17 being indicated by an arrow on FIG. 4. The lower surface of the tube 73 is parallel to the left side edge of blank 11 and spaced therefrom, and preferably directly overlies the margin to be heated so that the hot air jets strike the blank 11 at angles of approximately 90°, although the angle of impingement of the jets on the blank can vary from 90°. The length of the pattern of orifices on the tube 73 is preferably coextensive with the length of the side edge of the blank 11.

The edge heater 76 comprises an electrical heater 77 having an air passage therethrough which is operably connected to a suitable source of air under pressure, and a conduit 78. One end of conduit 78 is connected to the heated air outlet of heater 77 and the remote end of conduit 78 is closed. The conduit 78 is provided with a series of orifices 79 in the upper surface thereof in a pattern of one or more rows of orifices which is at least substantially coextensive with the length of the right side edge of blank 11 and which preferably is directly below the right side margin of blank 11 in the heating station 15, so that the jets of heated air strike the lower surface of the right side margin to heat the thermoplastic coating thereon to a suitable bond temperature. The upper surface of conduit 78 is at least substantially parallel to and spaced from the right side edge of blank 11.

Although separate electrical heaters 72 and 77 are illustrated for use in producing a directed flow of hot air from their associated conduits 73 and 78, suitable sources of thermal energy other than electrical heaters as well as the use of a single heating element to provide heated air to both conduits 73 and 78 can be used as desired. A preferred configuration illustrated, however, avoids the necessity for conveying heated air across the line of travel of the blank 11 as it is indexed by the conveyor 13 through the sidewall heater 15. The temperature of air applied to the edge portions of the blank 11 by the illustrated edge heaters 71 and 76 can be regulated by those skilled in the art to raise the temperature of the thermoplastic coating on the blank 11 to a suitable bonding temperature during the length of time which the blank 11 remains in the position illustrated by FIG. 4 between successive indexing steps of the conveyor 13.

Figure 5:
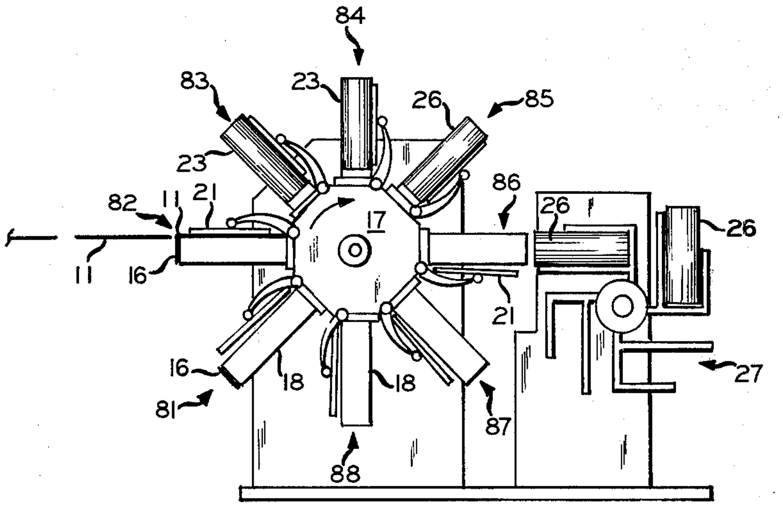
FIG. 5 is an elevation view of the main turret and container transfer turret of the machine of FIG. 1.
Figure 6:
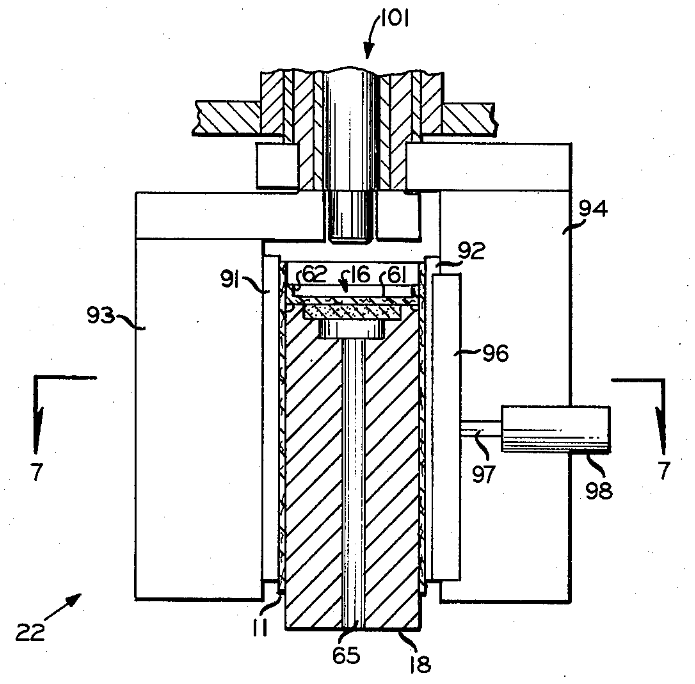
FIG. 6 is an elevation view, partially a cross section, of a container forming mandrel and sidewall wrapping mechanism of the machine of FIG. 1.

Referring now to FIG. 5, the turret mechanism is illustrated in simplified form. At the bottom feeder station 81 adjacent the bottom feeder 19 of FIG. 1 a closure member is positioned over the outer end of the respective mandrel 18 as illustrated by FIGS. 2 and 3. At the sidewall blank receiving station 82 a sidewall blank 11 is fed into the space between the mandrel 18 and the associated clamp arm 21. The clamp arm 21 is then actuated to secure the blank 11 against the mandrel 18. At the sidewall wrapping station 83 adjacent the sidewall wrapper 22 of FIG. 1 a folding mechanism (not shown) is actuated to fold the blank 11 about the mandrel 18 and to overlap and seal the free edges of the blank 11 to form a tubular body 23. At the bottom heating station 84 adjacent the bottom heater 24 of FIG. 1 hot air is applied to the annular skirt 62 of the closure member 16 and to the continuous edge of the tubular body 23 extending above the end of the mandrel 18 in order to heat the thermoplastic coating of the annular skirt 62 and the extending portion of the tubular body 23 to a suitable bonding temperature. At the bottom sealing station 85 adjacent the bottom sealing apparatus 25 of FIG. 1, pressure is applied to the heated areas of the closure member 16 and the tubular body 23 in order to shape the bottom of a container 26 by bonding the tubular body 23 to the annular skirt 62 of the closure member 16. At the transfer station 86 the pressure applied to the sidewall of the container 26 by the clamp arm 21 is released and the container 26 is stripped from the mandrel 18 by suitable means, preferably pneumatic pressure applied through the mandrel to the inside of the container 26, and is transferred to a pocket of the turret 27. The turret 27 is then rotated through an arc of 90° in order to bring the container 26 to an upright position ready for transfer to the receiving station of the container finishing apparatus 31. In stations 87 and 88 of the turret mechanism 17 the clamp arm 21 remains open in preparation for receipt of a succeeding sidewall blank, and any conditioning of the mandrel 18 necessary to prepare it for a succeeding cycle can be accomplished.

Referring now to FIGS. 6 to 10, bottom member 16 is illustrated, having a central disc portion 61 and an annular flange portion 62, and is held in place on the end face of mandrel 18 by the subatmospheric pressure maintained in conduit 65. Spring biased wiping blades 91 and 92, carried by folding wings 93 and 94 respectively, contact the outer surface of sidewall blank 11 on opposite sides of the respective clamp 21 when mandrel 18 is indexed into the sidewall wrapping station. The folding wings 93 and 94 are then actuated by any suitable means such as the illustrated concentric shaft assembly 101 to rotate about the longitudinal axis of the mandrel 18 in opposite directions to wrap the sidewall blank 11 around mandrel 18 to form the convolute container sidewall 23 in the sequence shown by FIGS. 8 to 10. When the degree of rotation illustrated in FIG. 9 is achieved, the rotation of blade 91 stops while the rotation of blade 92 and the associated sealing head 96 continues until the position illustrated in FIG. 10 is reached. Blade 91 can lead blade 92 by a few degrees so that when blade 91 stops, blade 91 holds the left edge portion of sidewall blank 11 generally against mandrel 18 while blade 92 and sealing head 96 continue to rotate to cause the right edge portion of blank 11 to overlap the left edge portion thereof. When the rotation of blade 92 is completed, sealing head 96 is actuated by piston 97 of pneumatic cylinder 98 to press the heated right edge portion of blank 11 against the heated left edge portion thereof to achieve a thermal bonding of the thermoplastic coatings and thereby form the convoluted container sidewall 23.

At the bottom heating station 84 a bottom heater means 24 such as the one illustrated by FIG. 11 is utilized to heat the annular skirt 62 of the bottom member 16 and the adjacent portion of the tubular sidewall 23 in order to soften the thermoplastic coatings thereof to a suitable bonding temperature. A tubular member 106 having a passageway 107 therethrough provides a supply of heated gas to a chamber 108 from which the heated gas is dispensed through a plurality of openings 109 located along the entire annular periphery of the chamber 108. An annular shroud 111 concentric with the annular outer surface of the chamber 108 and extending below the chamber 108 forms an annular heating area 112 into which the end of the tubular body 23 and the adjacent skirt 62 of the closure member 16 can be inserted in order to provide a forced flow of hot air or other suitable gas along the portions of the closure member 16 and tubular sidewall 23 which are to be heated. While the mandrel 18 remains stationary at the bottom heating station, the bottom heating means 24 is lowered into position with the edge of the tubular sidewall 23 and the skirt 62 of the closure member 16 extending into the annular space 112. The bottom heating means 24 is subsequently withdrawn to the position illustrated prior to indexing of the mandrel 18 to the next station. The temperature of air or other gas provided to the bottom heating means 24 and the length of time which the portions of the tubular sidewall 23 and closure member 16 to be heated are maintained within the annular opening 112 can be adjusted as required to achieve the desired degree of softening of the thermoplastic coatings on the sidewall 23 and the skirt 62.

A preferred bottom sealing means 25 is illustrated by FIG. 12. A rotating shaft 115 is equipped with a bottom sealing head 116 rigidly attached thereto and rotating therewith. A plurality of generally cylindrical rollers 117 are spaced around the perimeter of the head 116 and are rotatably affixed thereto with the axis of rotation of each roller 117 being directed radially outward from, and at a generally right angle to, the central axis of the shaft 115. As the rotating head 116 is lowered to the edge of the tubular sidewall 23 on the mandrel 18 located at the bottom sealing station, a depending annular flange 118 of the head 116 guides the edge of the tubular sidewall 23 into an annular groove 121 in each of the rollers 117. Further lowering of the head 116 coupled with the rotation thereof causes the generally semicircular cross section of the annular groove 121 in each roller 117 to roll the continuous edge of the tubular sidewall 23 inwardly, thereby enfolding the skirt 62 of the closure member 16 and applying pressure to the skirt 62 of the closure member 16 and the edge of the tubular sidewall 23 to bring the rolled sidewall and closure skirt into intimate contact with each other. After the sidewall and closure skirt have been rolled as desired, the bottom sealing means 25 is raised or withdrawn to its original position ready for subsequent sealing of the next sidewall 23 and closure member 16 indexed to the bottom sealing station. Cooling of the previously softened thermoplastic coating of the closure member 16 and tubular sidewall 23 during and immediately following the rolling of the edge of the tubular sidewall 23 and the skirt 62 of the bottom closure member will complete the bottom sealing operation.

FIG. 13 illustrates the preferred container finishing apparatus 31 having a base assembly 32 equipped with conveyor means for moving containers from station to station and means for grasping each container at one or more selected stations as well as a finishing means 33 located above one or more stations of the base assembly 32 for performing a finishing operation on a container 26. The illustration of FIG. 13 has been simplified by illustrating only those operating portions of the apparatus required to perform the necessary functions of the apparatus and omitting the various bearings, bushings, support members, and other similar conventional apparatus normally associated with the type of mechanisms shown and described. In addition, certain portions of the apparatus have been cut away to more clearly illustrate the operation of the apparatus. The base assembly 32 comprises a base plate 131 upon which are mounted a plurality of guide rails 132 positioned thereon to define one or more paths for generally straight line movement along the length of the base plate 131. While a generally continuous base plate 131 has been illustrated, it is understood that the base plate 131 can be shaped in many different configurations and still provide the required underlying surface between the guide rails 132 along which a container can be moved. Also, in place of the guide rails 132, guide wires or other similar means can be used for defining a generally straight line path of movement and for maintaining a container 26 or a plurality of such containers within the straight line path so defined.

Incremental movement of individual containers 26 along each straight line horizontal path defined by the guide bars 132 is accomplished by a conveyor means comprising a longitudinal member 135 oriented generally parallel to the direction of the straight line movement of the containers and pivotally mounted at a plurality of points along its length, at least two of which such points are drive points 136. Each of the drive points 136 is simultaneously driven through a locus defining a circle by a pair of radius arms 137 and 138 mounted on a pair of rotating shafts 141 and 142. The circular locus defined by the motion of each drive point 136 is preferably in a plane which is generally parallel to the straight line path defined by the guide bars 132 with the length of each radius arm 137 and 138 being substantially equal to provide drive point loci of substantially equal diameter. When the longitudinal member 135 is generally straight, the circular drive point loci will be generally coplanar. A timing belt 143 or other suitable arrangement such as a gear train is utilized to insure that the rotation of shafts 141 and 142 is synchronized in order to maintain the longitudinal member 135 at the desired fixed longitudinal orientation. A main drive shaft 145 operably connected to the container forming machine or to another suitable source of rotational power is used to drive an auxiliary drive shaft 146 associated with each conveyor means. Each auxiliary drive shaft 146 is operably connected to a gear box 146 or other suitable means for driving the shaft 142 which in turn drives the shaft 141 by means of the timing belt 143.

A plurality of transverse members 153, each rigidly affixed to the longitudinal member 135 and spaced at substantially equal distances along the longitudinal member 135, extend from the longitudinal member in a direction which is generally parallel to the plane of each circular locus defined by the path of a drive point 136. In the preferred embodiment illustrated, each transverse member 153 extends in a generally horizontal direction from the longitudinal member 135. In operation, therefore, each point along each transverse member 153 is moved in a circular path as the longitudinal member 135 is driven by the shafts 141 and 142. The effect of such motion is that each transverse member 153 successively engages a container located along the straight line path defined by the guide bars 132, slides the container 26 along the base plate 131 until the continuing arcuate movement of the tranverse member 153 withdraws the member from contact with the container whereupon each transverse member 153 will be returned through the completion of its circular path to contact a succeeding container to be advanced along the path of the conveyor. The incremental advancement of each container 26 accomplished in this manner is advantageous in that the constant rotational velocity of the shafts 141 and 142 will result in container movement which begins and ends more slowly than the speed of container advancement during the middle of each advancement step. The slower starting and finishing motion in each advancement step permits more precise contacting of each container to be advanced and more precise positioning of each container at the end of each advancement step by minimizing the tendency for a container 26 to be undesirably disturbed by the impulse of contact by a transverse member 153 or to continue to slide along the base plate 131 after forward motion by the transverse member 153 has ceased.

The positions at which containers 26 are at rest after having been advanced by a transverse member 153 and prior to their being contacted by a subsequent transverse member 153 can therefore be defined as stations of an intermittent conveyor at which various finishing operations can be performed on each container 26 prior to the continued forward movement of the container. In order to further assure precise positioning of each container 26 at a particular station of the finishing apparatus, gripping means can be provided at a location adjacent the base plate 131 to rigidly maintain each container 26 at a station during any particular finishing step. Each gripping means illustrated comprises a pair of generally parallel plates 161 and 162 with each plate 161 and 162 meeting with the other to define jaw means for gripping the bottom of a container 26 located at one or more stations of the finishing apparatus. In the particular embodiment illustrated by FIG. 13, each pair of plates 161 and 162 is adapted to grip the bottoms of containers located at three successive stations. It is to be understood that any combination of such stations, including one or all of the possible stations can be served in a similar manner. Each plate 161 and 162 is slidably mounted on a shaft 163 by means of a slidable bushing or bearing 164 at one end of each plate with a similar shaft and bearing arrangement (not shown) serving the opposite end of each plate. It is, of course, necessary to provide suitable openings 166 (FIG. 14) in the base plate 131 though which an operable sliding attachment to each shaft 163 can be accomplished. The use of a generally semi-circular gripping surface on each plate at each conveyor station served thereby provides a generally circular gripping surfaces when plates 161 and 162 are brought together so that each container gripped in accordance with the invention is gripped substantially around its entire perimeter, thereby helping to maintain the desired cross sectional shape of each container 26 during the finishing step or steps.

Although various arrangements can be utilized for drawing the plates 161 and 162 toward each other to grip a container and withdrawing the plates to release the container and provide a path for subsequent container movement, the preferred arrangement illustrated by FIG. 13 can be utilized when there are two or more lines of container conveyance disposed generally parallel to each other. Each plate 161 located along the outside of a line of conveyance is affixed by means of a connecting bar 167 to the opposite inside plate 162 in order to provide for simultaneous movement of each plate located at a first side of each line of conveyance and simultaneous movement of each plate located at the second side of each line of conveyance. A lever arm 171 pivotally mounted on a mounting bracket 172 has attached thereto a cam follower 173 which is held by a spring 176 in engagement with a cam 175 rigidly mounted on the shaft 142. An actuating rod 177 connects the moving end of the lever arm 171 to the plate 161 to impart sliding motion of the outside plate 161, and any inside plates 162 attached thereto, along the shaft 163. A similar arrangement for driving the outside plate 161 on the opposite side of the machine with synchronization between the shafts 142 on opposite sides of the machine will result in simultaneous motion of each pair of jaws 161 and 162 toward each other to grip a container 26 and away from other to release the container. It can readily be seen that such an arrangement can be expanded to include any number of parallel lines of conveyance and that, with modifications within the skill of those skilled in the art, can be further modified to serve a plurality of lines of conveyance which may be nonparallel.

The finishing means 33 can comprise any suitable means for performing desired operations on an open-topped container 26. A representative finishing means 33 illustrated by FIG. 13 comprises a housing 181 mounted on a pair of vertical reciprocating support members 182 which are in turn suitably mounted on suitable means for imparting a vertical reciprocating movement (not shown. Such means for imparting a vertical reciprocating movement could include a cam driven by the main drive shaft 145 or other similar means. The finishing means 33 illustrated is adapted to serve one station of each of the lines of conveyance of the base assembly 32 with a top flaring tool 183 mounted on a rotating shaft 184 driven by any suitable means (not shown) such as an electrical or pneumatic motor located within the housing 181. The motion of the reciprocating support members 182 is such that as a container 26 arrives at the station beneath the flaring tool 183 the housing 181 and attached flaring tool 183 are lowered to bring the flaring tool 183 into an operative relationship with the top of the container 26 and create a flared top rim **26*f* on the container 26 to provide for acceptance of a crimped metal closure or for other use in subsequent filling and sealing of the container 26. During the flaring operation the bottom of the container 26 is gripped by the opposing jaws 161 and 162. The housing 181 and flaring tool 183 are then raised by the supporting shaft 182 and the opposing plates 161 and 162 are withdrawn from their gripping position to permit the flared container to be removed and a succeeding container to be moved to the flaring station. Although only one finishing operation has been illustrated by FIG. 13 for the purpose of simplicity, the use of a plurality of successive finishing steps using finishing apparatus supported from and driven from within the housing 181 is within the scope of the invention. Such steps include, but are not limited to, vacuum cleaning of the interior of each container 26, flaring the top of each container, rolling the top of each container, spray coating the interior of each container, and other similar finishing steps which may desirably be utilized to improve the container 26** and to prepare each container for subsequent filling and closing operations.

The plan view of a container finishing apparatus base assembly 32 is illustrated by FIG. 14. As the turret 27 delivers an open-topped container to an upright position at a turret delivery station 201, the horizontally reciprocating pusher arm 29 delivers the container to one of two receiving stations 202. Each container is then successively conveyed through stations 203, 204, 205, 206, and 207 to a discharge station 208. As the containers arrive at stations 205, 206, and 207 they are gripped by the plates 161 and 162. With the exception of the base plate **131*a*, which has been altered to accommodate the turret 27 and to illustrate the manner in which various sized and shaped base plates can be utilized to accommodate the slidable movement of containers 26 thereon, the apparatus illustrated by FIG. 14 is a plan view of the apparatus of FIG. 13. The plate plate 131*a* can obviously be further modified to provide direct access to a takeoff conveyor at the discharge station 208 or to provide other suitable means for container discharge such as sliding the containers arriving at the discharge station 208** down an incline, dropping the containers into an appropriate chute, or other similar disposition of the containers.

A preferred flaring head 183 for use in accordance with the invention is illustrated by FIGS. 15 and 16. A main body member 221 is rigidly mounted on the rotating supporting shaft 184 of the finishing means 33 (FIG. 13). The main body member 221 comprises a generally cylindrical bottom portion 222 which is insertable into the open top of a container 26 and which extends downwardly from an annular flange member 223. A plurality of flaring pins 225 extend in a generally radial direction outwardly from the central axis of the flaring head 183 at an upward angle which is determined by the angle of flare desired at the top of the container 26 and are supported by the bottom portion 222 and annular flange 223 of the main body 221. Each flaring pins 225 can be either fixed or rotationally mounted and can be held in place by any suitable means such as a set screw (not shown). The extension of each of the flaring pins 225 across the annular juncture between the bottom portion 222 and the annular flange 223 of the main body 221 causes the effective cross section of the flaring means 183 to be such that a flare **26*f* will be created at the top edge of a container 26 when the flaring head 183 is lowered into the open top of the container during the container finishing step. Use of a plurality of flaring pins 225 is preferred over the use of a solid main body portion 221 having an equivalent cross sectional shape since the same flaring effect is achieved and since the tendency toward heat buildup along a continuous working surface is avoided by the decreased working surface and increased capability for heat dissipation which the flaring pins provide. Although substantially straight, generally cylindrical flaring pins 25 have been illustrated, the shape of the flaring pins 225 can obviously be altered to provide a properly shaped flare 26*f*** for a large number of specific applications.

A preferred top rolling tool 231 for use as a portion of the finishing means 33 of the invention is illustrated by FIGS. 17 and 18. A rotating rolling head 232 is rigidly attached to the rotating shaft 184 of the finishing means 33. A central portion 233 of the rolling head 232 has a tapered lead-in surface 235 which guides the top of a container onto which the rolling head 232 is lowered into an annular groove 236 of generally semicircular cross section at the bottom edge of the rotating central portion 233. The radius of curvature of the annular groove 236 is the radius desired for the rolled top **26*r* of the container 26. A plurality of rolling fingers 241 are spaced around the annular outer periphery of the central portion 233 and are pivotally mounted on pivot points 242 so that a roll completion tool 243 attached to the end of each finger 241 can be moved radially inward toward the central axis of the shaft 184 to guide the top of the container received in the annular groove 236 into the desired rolled configuration. The completion tool 243 can then be withdrawn to the position illustrated by FIGS. 17 and 18 in order for the completed top roll 26*r* of the container to be withdrawn from the rolling tool. A spring means 245 is utillized to maintain each roll completion tool 243 in the withdrawn position illustrated until a cam surface 246 located at the end of spindle 247 is lowered toward the rolling head 232 in order to pivot the fingers 241 about their pivot points 242 and bring the roll completion tools 243 into their working position. The spindle 247 is affixed to the shaft 184 in such a manner that it will rotate with the shaft 184 but can be moved longitudinally along the shaft in either direction by movement of a bearing 251. The bearing 251 is attached to the central portion of a yoke 252 which is rotatable around a pivot point 253 on a first side thereof and is driven on the opposite side thereof by any suitable source of reciprocating motion such as a pneumatic cylinder 255. As the piston rod 256 of the pneumatic cylinder 255 is extended downwardly, the cam surface 246 pivots the fingers 242 outwardly at the top, thereby expanding the spring means 245 and bringing roll completion tools 243 into their working position. As the piston rod 256 is raised the operable engagement (not shown) between the spindle 247 and the bearing 251 raises the cam surface 246, thereby permitting the spring means 245 to contract and withdraw the roll completion tools 243 from their working position and permit extraction of the top roll 26*r* from the rolling tool. A shield or other suitable protective means 261 can be used in conjunction with the top rolling apparatus or with any other similar apparatus extending from the housing 181 for protective purposes. For easy illustration, other commonly utilized protective and frame members such as the frame member supporting the pivot 253 which in turn supports the first end of the yoke 252 have been omitted from FIGS. 17 and 18**.

During either flaring of the top of the container 26 by a suitable flaring head or rolling of the top by a suitable rolling device, the container is maintained in a stationary position by the gripping means of the container finishing apparatus. While the particularly preferred rotating container finishing means illustrated and described herein are preferred for forming certain finishing operations on containers having a generally round cross section, it can be readily observed that other suitable finishing means can be used in conjunction with the remainder of the container finishing apparatus to provide finishing of tubular containers having various cross sectional shapes and sizes.

While each aspect of the invention has been described in conjunction with a preferred embodiment thereof, it is to be understood that equivalent embodiments and modifications by those skilled in the art are within the scope of the invention. For example, the locus of the pivot points 136 of the finishing apparatus conveyor can be any circuitous path such as an oval or other similar path defined by a rotating cam means attached to a drive shaft and having a path of the desired shape to be followed by the pivot point 136. As another example, the transverse members 153 can include members having a surface transverse to the longitudinal member 135 but defining any appropriate area including a semicircular or other shaped pocket to accommodate the containers to be conveyed. These and other reasonable variations and modifications by those skilled in the art are within the scope of the invention and of the appended claims thereto.

We claim:

1. Conveyor means for incrementally advancing individual articles in a generally straight line movement to successive conveyor stations, comprising:
- support means;
- a longitudinal member carried by said support means and oriented generally parallel to the direction of said generally straight line movement and pivotally mounted at a plurality of points, at least two of which are drive points, along its length;
- means operably associated with said longitudinal member for moving each said drive point through a circuitous locus, each such locus being in a plane which is generally parallel to said generally parallel straight line movement, and such loci being of substantially equal shape;
- a plurality of transverse members, each rigidly affixed to said longitudinal member, spaced at substantially equal distances along said longitudinal member;
- a stationary surface underlying said transverse members for accommodating the sliding movement of articles thereon; and
- gripping means movably mounted on said support means and positioned adjacent said longitudinal member, said gripping means being operable for selectively engaging an article at one or more stations and preventing advancing movement and rotational movement of the article when said gripping means is in engagement therewith, said gripping means including two generally parallel gripping members, each said gripping member mating with the other to define jaw means for gripping an article with the thus gripped article being located at a respective one of said stations of said conveyor means, said jaw means being sized and shaped to engage a substantial portion of the periphery of the article therein;
- means for moving both said gripping members toward each other to grip the bottom of an article and for moving both said gripping members away from each other to release an article.

2. Conveyor means in accordance with claim 1 wherein the circuitous loci of said drive points are substantially coplanar.

3. Conveyor means in accordance with claim 1 wherein said longitudinal member is mounted at two points.

4. Conveyor means in accordance with claim 3 wherein the circuitous loci of said drive points are circular and are substantially coplanar.

5. Conveyor means in accordance with claim 1 wherein said transverse members extend generally horizontally from said longitudinal member.

6. Conveyor means in accordance with claim 5 wherein said generally straight line movement is in a generally horizontal direction.

7. Conveyor means in accordance with claim 6 wherein the circuitous loci of said drive parts are substantially coplanar.

8. Conveyor means in accordance with claim 7 comprising a plurality of said longitudinal members for simultaneously advancing a plurality of lines of said articles.

9. Conveyor means in accordance with claim 8 comprising two said longitudinal members for simultaneously advancing two lines of said articles.

10. Conveyor means in accordance with claim 1 additionally comprising means for coordinating the action of said gripping means with the action of said means for moving each said drive point in order to provide for gripping said articles located at one or more of said conveyor stations when said articles are not being advanced and for releasing said articles during the incremental advancement thereof.

11. Conveyor means in accordance with claim 1 comprising a plurality of said longitudinal members for simultaneously advancing a plurality of lines of said articles, each said longitudinal member having a gripping means associated therewith, said means for moving said gripping members comprising:

first means operably connected to each said gripping member located at a first side of each article line for simultaneously moving each said gripping member operably connected thereto; and second means operably connected to each said gripping member located at a second side of each said article line for simultaneously moving each said gripping member operably connected thereto.

12. Conveyor means in accordance with claim 11 wherein said generally straight line movement is in a generally horizontal direction.

13. Conveyor means in accordance with claim 12 wherein the circuitous loci of said drive parts are substantially coplanar.

14. Conveyor means in accordance with claim 13 wherein said transverse members extend generally horizontally from said longitudinal member.

15. Conveyor means in accordance with claim 14 comprising two said longitudinal members for simultaneously advancing two lines of said articles.

* * * * *